United States Patent [19]
Aoshima et al.

[11] Patent Number: 5,598,384
[45] Date of Patent: Jan. 28, 1997

[54] FEED SEARCH SYSTEM FOR OPTICAL DISK RECORDING DEVICE

[75] Inventors: Shinji Aoshima; Morito Morishima, both of Hamamatsu, Japan

[73] Assignee: Yamaha Corporation, Japan

[21] Appl. No.: 577,773

[22] Filed: Dec. 22, 1995

[30] Foreign Application Priority Data

Dec. 27, 1994 [JP] Japan .................................. 6-338266

[51] Int. Cl.$^6$ .................................................. G11B 17/22
[52] U.S. Cl. .......................................... 369/32; 369/44.28
[58] Field of Search .................................... 369/32, 44.28, 369/44.27, 44.26, 44.29, 44.34, 44.35; 360/78.04, 78.09

[56] References Cited

U.S. PATENT DOCUMENTS

| | | | |
|---|---|---|---|
| 4,727,530 | 2/1988 | Tomisawa | 369/50 |
| 4,803,675 | 2/1989 | Komatsu | 369/32 |
| 4,847,821 | 7/1989 | Baas | 369/32 |
| 5,050,146 | 9/1991 | Richgels et al. | 369/32 |
| 5,140,570 | 8/1992 | Nagasawa et al. | 369/32 |
| 5,446,708 | 8/1995 | Takebayashi et al. | 369/32 |

*Primary Examiner*—Tan Dinh
*Attorney, Agent, or Firm*—Graham & James LLP

[57] ABSTRACT

A phase shifting device including multipliers, a table and first adders, generates and outputs first shifted phase data and second shifted phase data obtained by shifting first feed phase data and second feed phase data as much as a phase displacement from a rising zero cross point in a last cycle of the first feed phase data to a target position. A counting device counts down upon every rising zero cross point of the first shifted phase data as many as the number of revolutions of a motor up to the target position, and then activates a brake mode at the next falling zero cross point of the first shifted phase data. In the brake mode, a controlling device feed-controls so as to converge at a rising zero cross point of the first shifted phase data after the end of the counting, through a second adder, a limiter, a loop filter, and a third adder.

11 Claims, 2 Drawing Sheets

FEED SEARCH SYSTEM FOR OPTICAL DISK RECORDING DEVICE

BACKGROUND OF THE INVENTION

1. Field of the Invention

This invention relates to a feed search system of a pickup used for devices for recording and/or reproducing discs such as CDs (Compact Discs) and MDs (Mini Discs).

2. Background

To feed-search a position of a pickup for a CD player, several systems have heretofore been known. One system is such that the pickup is brought to a target position by recording a recording position identifying mark on the recording surface of the CD together with recording data and reading the mark during the feed search operation. Another system is such that the pickup is set to a target position by calculating a number of revolutions of the feed motor up to the target position in advance and counting the number of revolutions of the feed motor during the feed search operation.

However, in the aforementioned conventional feed search systems, the former is disadvantageous in having to write superfluous data into the CD, whereas the latter is problematical in that positioning accuracy is impaired when the number of revolutions of the motor required for the total stroke of a feed operation is small and that a longer feed time is entailed when the number of revolutions of the motor is large because positioning accuracy in the latter system is dependent only on the number of revolutions.

SUMMARY OF THE INVENTION

The present invention has been made in order to overcome the above problems and drawbacks, and an object of the invention is to provide a feed search system capable of positioning the pickup quickly and accurately without writing superfluous data into the recording medium.

A feed search system of the invention includes: a phase shifting device for generating and outputting first shifted phase data and second shifted phase data obtained by shifting first feed phase data and second feed phase data to be outputted in synchronism with a feed of a feeding object as much as a phase displacement from one of zero cross points in a last cycle of the first feed phase data to a target position; a counting device for outputting a brake signal at a predetermined timing after counting the zero cross points of the first shifted phase data obtained by the phase shifting device as many as the number of cycles of the feed phase data contained between a current position and the target position; and a controlling device for outputting a control signal so as to move the feeding object toward the target position, and outputting the control signal so that the feeding object is stopped at a zero cross point of the first shifted phase data when the brake signal has been output from the counting device.

According to the present invention, the phase shifting device phase-shifts the two-phase feed phase data to be outputted in synchronism with the feed of the feeding object as much as the phase displacement from the one of zero cross points in the last cycle of the first feed phase data to the target position, so that the first and second shifted phase data are generated. Therefore, the target position stays on a zero cross point of the first shifted phase data. As a result, if the zero cross points of the first shifted phase data is counted as many as the number of cycles of the feed phase data contained between the current position and the target position, the next zero cross point of the first shifted phase data coincides with the target position. In the present invention, the shift amount can be selected arbitrarily, and the controlling device feed-controls so that the shifted phase data can converge at the zero cross point. Therefore, extremely accurate positioning at the target position can be achieved.

DETAILED DESCRIPTION OF THE PREFERRED EMBODIMENTS

An embodiment of the invention will now be described with reference to the drawings.

Figure 1:
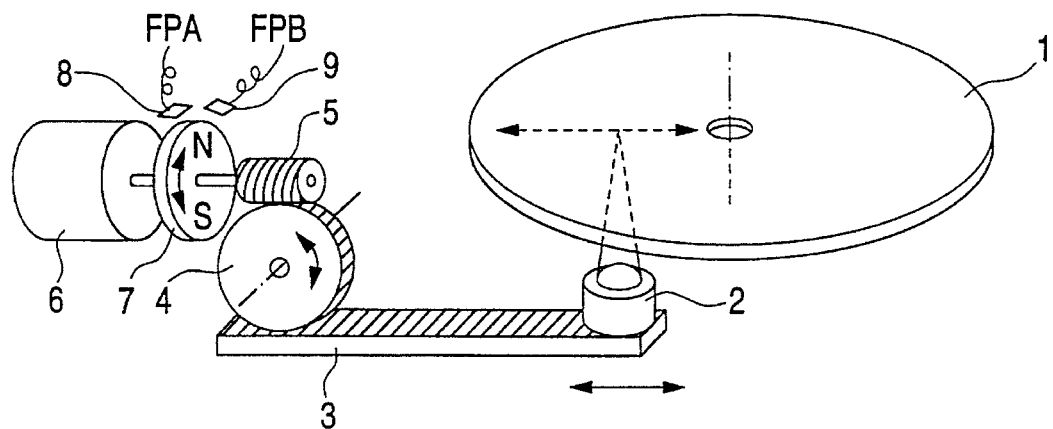
FIG. 1 is a perspective view showing the main portion of a CD player to which an embodiment of the invention is applied.

FIG. 1 is a perspective view showing the main portion of a CD player to which an embodiment of the invention is applied.

An optical pickup 2 that reads data on a CD 1 by a reflecting beam of light obtained by injecting the beam of light onto the CD 1 is carried on a rack 3. The rack 3 is designed to be driven in the radial direction of the CD 1 by a feed motor 6 through a pinion 4 and a worm gear 5. As a result of this mechanism, the optical pickup 2 is fed. A magnet 7 is fixed to the rotating shaft of the feed motor 6. Hall elements 8, 9 are arranged so as to keep a predetermined phase relationship while confronting the magnet 7. Two-phase feed phase data FPA, FPB are outputted from the hall elements 8, 9, respectively, in synchronism with a revolution of the feed motor 6.

Figure 2:
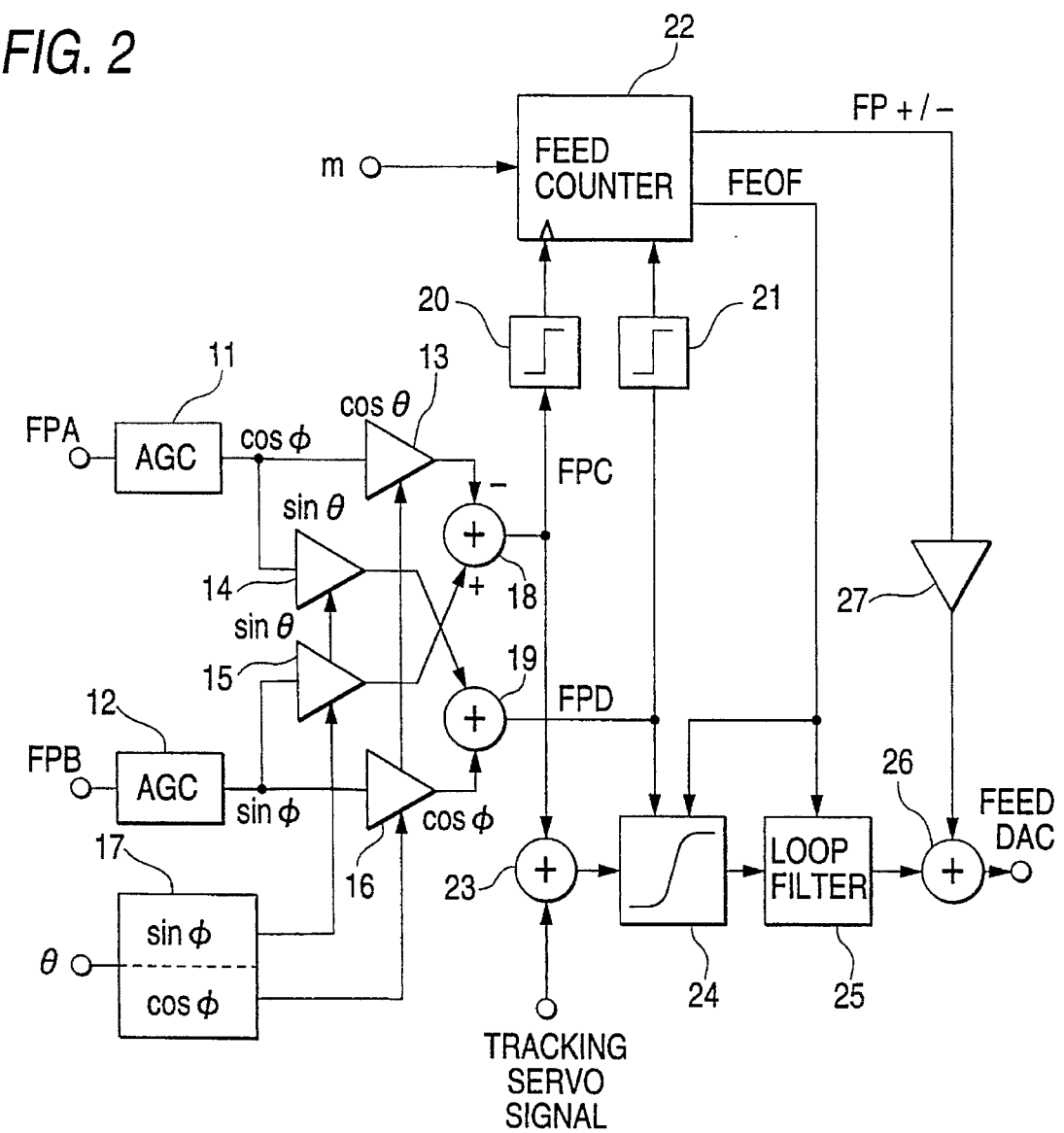
FIG. 2 is a block diagram of a feed search system of the CD player.
Figure 3:
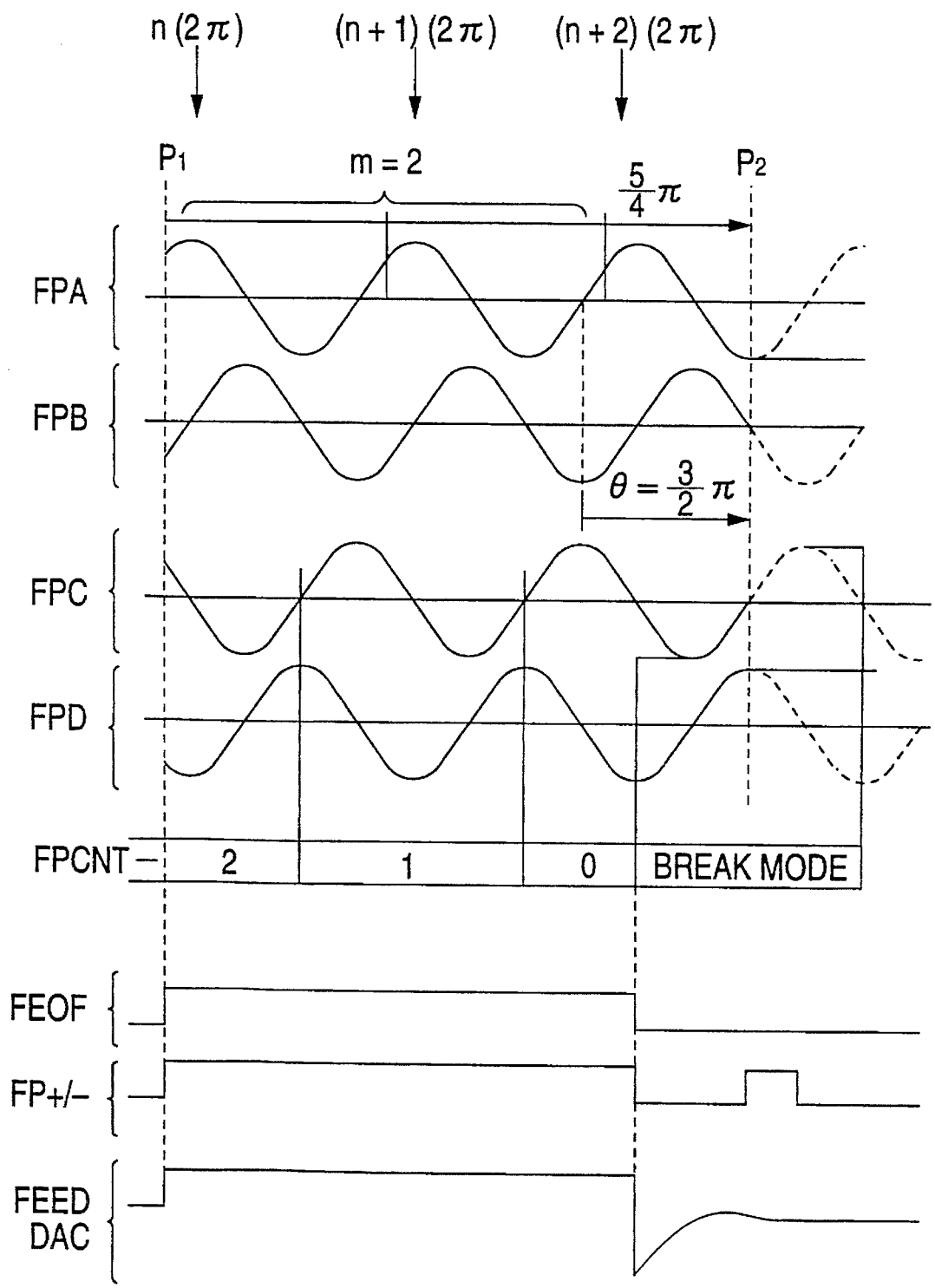
FIG. 3 is a diagram showing various data of the feed search system.

FIG. 2 is a block diagram showing the configuration of a feed search system that feeds the optical pickup 2 to a target position based on the two-phase feed position data FPA, FPB, and FIG. 3 is a diagram showing various data of the feed search system.

As shown in FIG. 3, the two-phase feed phase data FPA, FPB are expressed as
[NE 1]

$$FPA = \cos\phi$$

$$FPB = \sin\phi$$

If a target position P2 is feed-searched from a current position P1, then, e.g., a not shown CPU gives the number of cycles of the feed phase data contained between P1 and P2, i.e., the number of revolutions m of the feed motor 6 required for the pickup 2 to move from P1 to P2, as well as a phase displacement $\theta$ from one of zero cross points of the feed phase data FPA, e.g., the rising zero cross point, with respect to the target position P2.

That is, to feed the optical pickup 2 from P1 to P2 shown in FIG. 3, the absolute phases of P1, P2 become as follows.

[NE 2]

$$P1 = (n-1)(2\pi) + 7\pi/4$$

$$P2 = (n+2)(2\pi) + \pi$$

Therefore, the displacement from P1 to P2 is given as [NE 3]

$$P2-P1=2(2\pi)+5\pi/4$$

The number of revolutions m of the feed motor 6 is, therefore, set to "2". Further, the phase displacement θ between a last rising zero cross point of the feed phase data FPA and P2 is equal to "3 π/ 2", the last rising zero cross point being defined as last in terms of the feed phase data FPA reaching from P1 to P2. These numbers, i.e., the number of revolutions m and the phase displacement θ are calculated by the CPU in advance.

On the other hand, the two-phase feed phase data FPA, FPB are A/D converted, subjected to automatic gain control by automatic gain controlling sections 11, 12, and then fed to multipliers 13, 14 and multipliers 15, 16, respectively. Further, the phase displacement θ at the target position is supplied to a table 17, and the table 17 outputs sinθ and cosθ. These data are multiplied at the multipliers 13 to 16, and the products are then subjected to subtraction and addition at adders 18, 19. Outputted from the adders 18, 19 are such two-phase shifted phase data FPC, FPD as indicated by numerical expression 4.

$$
\begin{aligned}
FPC &= \sin\phi \sin\theta - \cos\phi \cos\theta \qquad [NE\ 4]\\
&= \cos(\phi - \theta)\\
FPD &= \cos\phi \sin\theta - \sin\phi \cos\theta\\
&= \sin(\phi - \theta)
\end{aligned}
$$

As is apparent from the above, the multipliers 13 to 16, the table 17, and the adders 18, 19 constitute a phase shift device for phase-shifting the feed phase data FPA, FPB only by the phase displacement θ. These phase data FPA, FPB, FPC, FPD are related by the chart shown in FIG. 3.

The shifted phase data FPC, FPD are binary-coded by binary-coding sections 20, 21 and then applied to a feed counter 22. The feed counter 22 counts down upon every rising zero cross point of the shifted phase data FPC with the number of revolutions m of the feed motor 6 up to the aforementioned target position set at feed search start. The feed counter 22 also judges the feed direction from the phase relationship between the binary-coded shifted phase data FPC, FPD and outputs feed direction data FP +/−. In addition, the feed counter 22 outputs mode data FEOF that distinguishes a count period from a brake mode period that will be described later. The feed counter 22 enters into the brake mode at a next falling zero cross point of the shifted phase data FPC with the feed counter 22 indicating a count of zero.

On the other hand, in the brake mode, the shifted phase data FPC is outputted to a DAC (D/A converter) as control data for controlling the feed motor 6 through a control system that includes an adder 23 (a tracking error signal from a not shown tracking servo system is applied), a limiter 24, a loop filter 25, and an adder 26. As shown in FIG. 3, the limiter 24 is provided to flatten phase component deviating from the slope including a rising zero cross point of the shifted phase data FPC so that such deviating phase component can converge at the zero cross point in the brake mode easily. The limiter 24 limits FPC when FPD is negative by utilizing the shifted phase data FPD that is 90° ahead of the shifted phase data FPC. The loop filter 25 has such a transmission characteristic as to match the loop characteristics of the Hall elements 8, 9, the A/D and D/A converters, the feed motor 6, and the like, and is provided to stabilize the servo system. The adder 26 is provided to determine the feed motor 6 rotating direction by adding the feed direction data FP +/− to the output of the loop filter 25 with a predetermined gain.

The adder 26 may be constructed of a multiplier. It may be noted that during the count period in which the feed counter 22 is counting, the limiter 24 and the loop filter 25 are inoperative and a predetermined value defined by the feed direction data FP +/− is applied to DAC.

As described above, the feed search system according to this embodiment is characterized as not only generating the shifted phase data FPC by shifting the feed phase data FPA as much as the phase displacement θ from the rising zero cross point of the FPA to the target position P2, and counting the rising zero cross point of the FPC, but also activating the brake mode at the next falling zero cross point of the PFC after the end of the counting so that feed control is effected to cause the shifted phase data FPC to converge at the next zero cross point thereof. Therefore, higher accuracy is ensured for the positioning within a single revolution of the feed motor 6.

While the two-phase feed phase data from the hall elements are used in the aforementioned embodiment, any signals that are in synchronism with a feed, such as signals outputted in response to, e.g., an encoder position or a rack position may also be used as the feed phase data.

Further, feed direction judgment may be made based on the phase relationship with bit data on a recording medium, a tracking error signal, and the like.

As described in the foregoing, according to the present invention, shifted phase data are generated by a phase shifting device phase-shifting two-phase feed phase data to be outputted in synchronism with a feed of a feeding object as much as a phase displacement from one of zero cross points in a last cycle of the feed phase data to a target position. The counting device counts the zero cross point of the thus obtained shifted phase data as many as the number of cycles of the feed phase data contained between a current position and the target position. The controlling device feed-controls so that the shifted phase data can converge at a next zero cross point thereof. Therefore, extremely accurate positioning to the target position can be implemented with inexpensive elements and circuits without writing superfluous data into a recording medium.

What is claimed is:

1. A feed search system for setting a pickup from a position to a target position, comprising:

a feed mechanism for moving the pickup to the target position, said feed mechanism including a feed motor for moving said feed mechanism by a revolution thereof;

a converting device for converting the revolution of said motor to a first signal and a second signal;

phase shifting means for generating a third signal and a fourth signal obtained by shifting the first signal and the second signal in accordance with a phase displacement from a rising zero cross point in a last cycle of the first signal between the position and the target position to the target position;

counting means for counting rising zero cross points of the third signal in accordance with the number of revolutions of said motor being contained between the position and the target position, and outputting a brake signal at a falling zero cross point which is sequent to a last counted one of the rising zero cross points of the third signal; and controlling means for outputting a control signal for moving the pickup to the target position, wherein when said counting means outputs the brake signal, said controlling means output the control signal so as to stop the pickup at a rising zero cross point which is sequent to said falling zero cross point of the third signal.

2. The feed search system of claim 1, wherein said converting device includes a magnet fixed at a rotating shaft of said motor and two hall elements arranged so as to keep a predetermined phase relationship while confronting said magnet, said hall elements being generated the first signal and the second signal by rotating said motor.

3. The feed search system of claim 1, wherein said phase shifting means includes a table for outputting signals by supplying the phase displacement at the target position, multipliers for multiplying said signals from said table and the first signal and the second signal being A/D converted, and first adders for outputting the third signal and the fourth signal after adding and subtracting output signals from said multipliers.

4. The feed search system of claim 1, wherein said controlling means includes a limiter, a loop filter, a second adder and a third adder.

5. The feed search system of claim 4, wherein said limiter limits from a slope including a rising zero cross point of the third signal when the brake signal is output from said counting means, and said loop filter is provided to stabilize said motor and said converting device.

6. A feed search system for setting a pickup from a position to a target position, comprising:

a feed mechanism for moving the pickup to the target position, said feed mechanism including a feed motor for moving said feed mechanism by a revolution thereof;

a converting device for converting the revolution of said motor to a first signal and a second signal;

phase shifting means for generating a third signal and a fourth signal obtained by shifting the first signal and the second signal in accordance with a phase displacement from a falling zero cross point in a last cycle of the first signal between the position and the target position to the target position;

counting means for counting falling zero cross points of the third signal in accordance with the number of revolutions of said motor being contained between the position and the target position, and outputting a brake signal at a rising zero cross point which is sequent to a last counted one of the falling zero cross points of the third signal; and controlling means for outputting a control signal for moving the pickup to the target position, wherein when said counting means outputs the brake signal, said controlling means output the control signal so as to stop the pickup at a falling zero cross point which is sequent to said rising zero cross point of the third signal.

7. The feed search system of claim 6, wherein said converting device includes a magnet fixed at a rotating shaft of said motor and two hall elements arranged so as to keep a predetermined phase relationship while confronting said magnet, said hall elements being generated the first signal and the second signal by rotating said motor.

8. The feed search system of claim 6, wherein said phase shifting means includes a table for outputting signals by supplying the phase displacement at the target position, multipliers for multiplying said signals from said table and the first signal and the second signal being A/D converted, and first adders for outputting the third signal and the fourth signal after adding and subtracting output signals from said multipliers.

9. The feed search system of claim 6, wherein said controlling means includes a limiter, a loop filter, a second adder and a third adder.

10. The feed search system of claim 9, wherein said limiter limits from a slope including a falling zero cross point of the third signal when the brake signal is output from said counting means, and said loop filter is provided to stabilize said motor and said converting device.

11. A disc recording and reproducing device having a feed search system for setting a pickup from a position to a target position on a disc, said feed search system comprising:

a feed device for moving the pickup;

a signal generator that generates a first signal and a second signal in accordance with a position of the pickup moved by said feed device;

phase shifting means for generating a third signal and a fourth signal obtained by shifting the first signal and the second signal in accordance with a phase displacement from a rising zero cross point in a last cycle of the first signal between the position and the target position to the target position;

counting means for counting falling zero cross points of the third signal being contained between the position and the target position, and outputting a brake signal at a cross point which is sequent to a last counted one of the falling zero cross points of the third signal; and feed controlling means for outputting a feed control signal to said feed device, wherein when said counting means outputs the brake signal, said feed controlling means output the control signal so as stop the pickup at a rising zero cross point which is sequent to said falling zero cross point of the third signal.

* * * * *